J. C. GLENN.
FLUID OPERATED VALVE MECHANISM.
APPLICATION FILED NOV. 10, 1915. RENEWED JAN. 8, 1918.
1,260,184.
Patented Mar. 19, 1918.
2 SHEETS—SHEET 1.
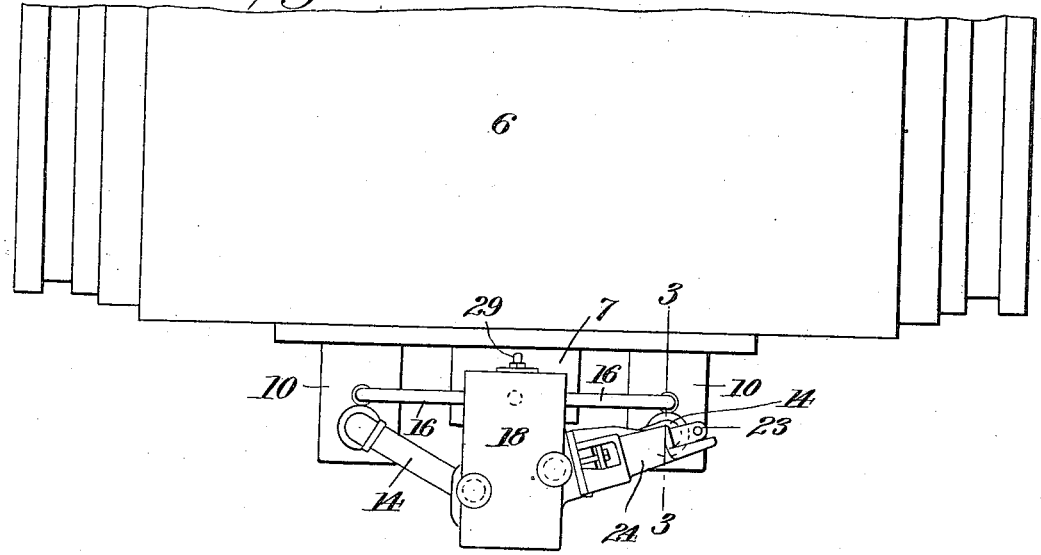
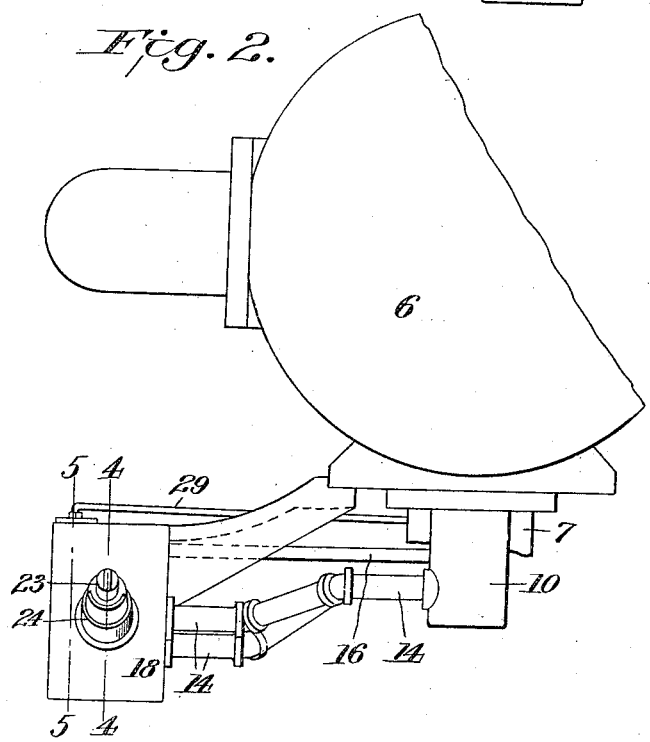
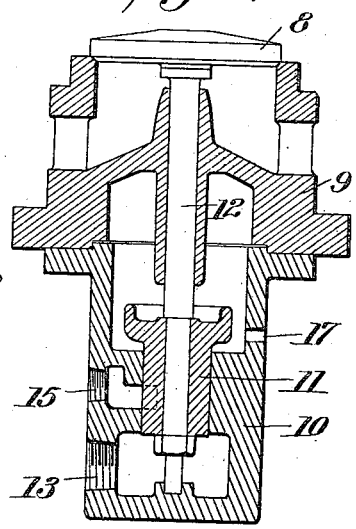
Witnesses
H. E. Coburn.
Harry G. Adam
Inventor
John C. Glenn
by Gw. E. Few
Attorney

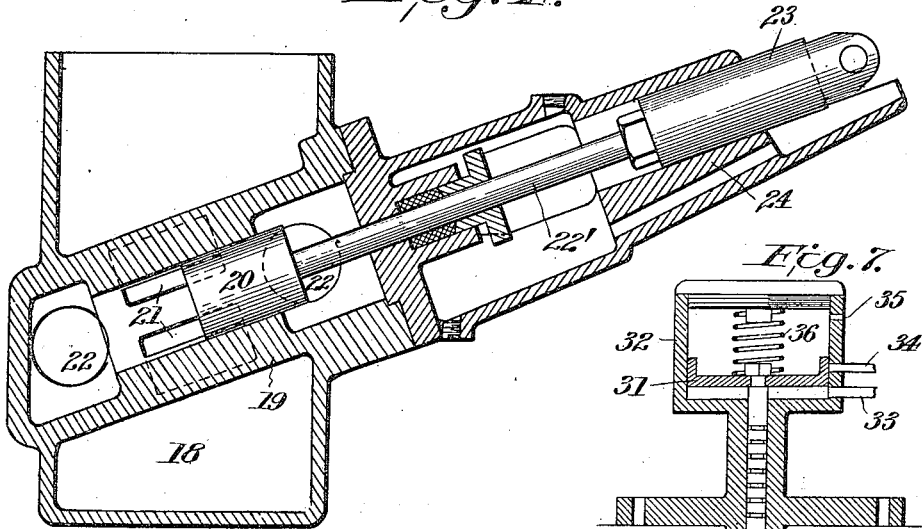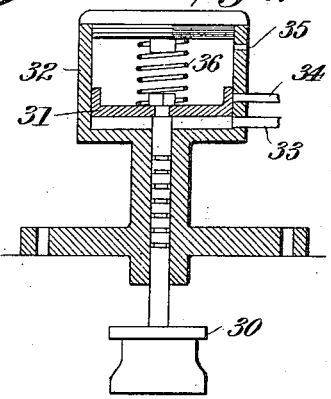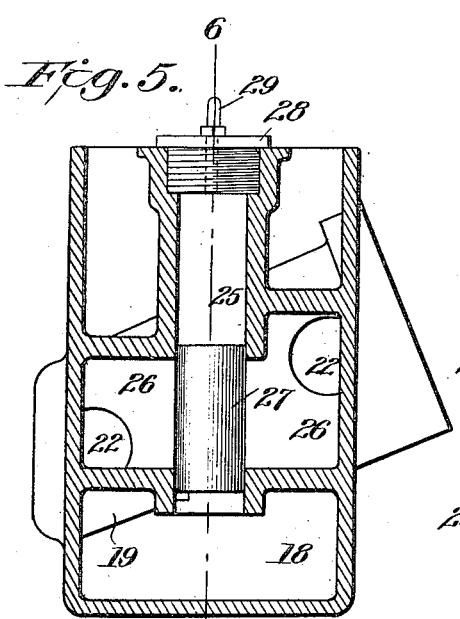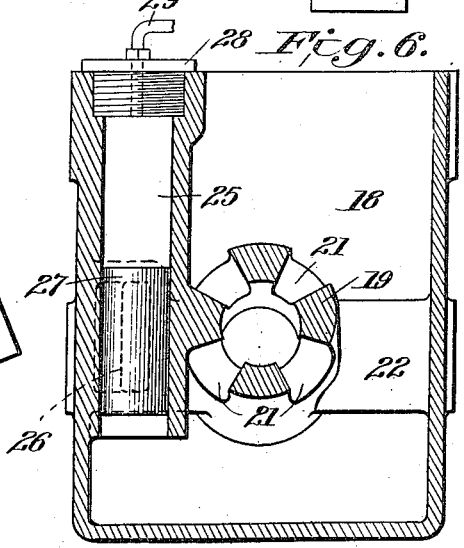

UNITED STATES PATENT OFFICE.

JOHN C. GLENN, OF ERIE, PENNSYLVANIA, ASSIGNOR TO SKINNER ENGINE COMPANY, OF ERIE, PENNSYLVANIA, A CORPORATION OF PENNSYLVANIA.

FLUID-OPERATED VALVE MECHANISM.

1,260,184.   Specification of Letters Patent.   Patented Mar. 19, 1918.

Application filed November 10, 1915, Serial No. 60,711. Renewed January 8, 1918. Serial No. 210,946.

*To all whom it may concern:*

Be it known that I, JOHN C. GLENN, a citizen of the United States, residing at Erie, in the county of Erie and State of Pennsylvania have invented certain new and useful Improvements in Fluid-Operated Valve Mechanisms, of which the following is a specification.

This invention relates to fluid operated valve mechanisms, and has for its object to provide an improved mechanism for operating valves by means of fluid pressure which circulates fluid such as oil to and from a cylinder or the like containing a piston or its equivalent which is connected to the valve to be operated. In the embodiment shown the impulses of the pump are timed according to the work to be done; in engine practice according to the cycle of the engine, the pump being conveniently operated by connection to a moving part of the engine. For example the mechanism may be used to operate the exhaust valves shown in the Skinner-Williams Patent No. 1033280.

In connection with the parts above referred to a control is provided, especially for use in connection with the Skinner-Williams engine referred to, which is adapted to permit the effective action of the pump when the engine is running non-condensing, and to prevent said action when the engine is running condensing, the pump being automatically thrown into or out of action according to the presence or absence of a vacuum.

It may be explained that the Skinner-Williams engine above referred to is of the uniflow type, having middle exhaust ports which are controlled by the piston, and auxiliary exhaust ports controlled by valves, the latter being located between the middle ports and the ends of the cylinder. When this engine is running non-condensing the valves are operated to open and relieve compression on the return stroke of the piston. When the engine is running condensing, there is no need for the operation of the valves, since the vacuum will prevent or reduce compression on the return stroke. The gear for operating the valves in said engine is a mechanical one, for which the present mechanism may be substituted, giving in addition an automatic shift from condensing to non-condensing conditions.

In the accompanying drawing, Figure 1 is a side view of an engine cylinder of the kind referred to, provided with the improved mechanism. Fig. 2 is an end view thereof. Fig. 3 is an enlarged section on the line 3—3 of Fig. 1, showing one of the exhaust valves. Fig. 4 is an enlarged section on the line 4—4 of Fig. 2. Fig. 5 is an enlarged section on the line 5—5 of Fig. 2, and Fig. 6 is a section on the line 6—6 of Fig. 5. Fig. 7 is a section of a modification showing the invention applied to a steam valve.

The cylinder 6 of the engine is provided with the usual exhaust pipe 7 communicating with the middle exhaust ports, and leading if desired to a condenser. This pipe also communicates with the supplemental exhaust ports which are controlled by valves 8 operating in cages 9, these valves being of the puppet type as shown for example in the patent to Williams-Skinner No. 1109807, instead of the slide valves shown in the patent above mentioned. These valves 8 are lifted at proper times in the cycle to let out residual steam. Each valve cage or casing has attached thereto a cylinder 10 containing a piston 11 mounted on the valve stem 12 which reciprocates therewith. Below the piston the cylinder is tapped as shown at 13 for pipe 14 which communicates with the pump, and is also tapped above as indicated at 15 for a return pipe 16 to the pump. A vent 17 is provided to let off leakage around the piston.

When pump pressure is applied to the piston 11 it lifts and opens the valve, and when lifted far enough the return through the pipe 16 is opened, giving an overflow or return circulation to the pump. It will be understood that there is one set of these connections for each valve, in a double acting engine.

The pump comprises a supply well or casing 18, with a pump barrel 19 therein, and a piston 20 in the barrel. The pump is shown of the double acting valveless type, its barrel having inlet ports 21 from the well and outlet ports 22 connected respectively to the pipes 14 and also, at the opposite side of the pump barrel, to by-pass passages 26, for a purpose to be hereinafter described. When the pump piston reciprocates it forces oil in one direction to one valve, to open the same, and withdraws it from the other, to permit the latter to close, as well as drawing any excess required through the ports 21. As shown, the pump barrel is at an angle so that its plunger may be operated directly from the eccentric rod, by means of the piston rod 22' and connection 23 working in a guide 24. This may be varied according to local conditions.

For the vacuum control of the pump a cylindrical valve casing 25 is cored in the well, at the side of the pump barrel, and this communicates with opposite ends of the barrel through ports or passages 26 which are controlled by a plug valve 27. The casing 25 is closed at the top by a screw plug 28, with an opening through the same connected by a pipe 29 to the exhaust pipe 7.

When the plug 27 is in its lower position, as in non-condensing operation, it closes the by-passes 26, and when the pump operates, the fluid propelled thereby acts on the valves to operate the same. When the engine is operating condensing, and a sufficient vacuum is drawn, it lifts the valve 27 and opens the by-passes 26. Then, the pump is ineffective, since the fluid will pass back and forth through the by-passes and the valve chamber from one end of the pump barrel to the other, and no operation of the valves will result.

In the modification shown in Fig. 7 the same principle is applied to the steam inlet valve 30, which is connected to piston 31, in a cylinder 32. 33 is the inlet from the pump, 34 the outlet or return to the pump, and 35 a vent for leakage. A spring 36 tends to close the valve. When pressure enters below the piston, on one stroke of the pump, the valve is lifted and opened, and seats on the return stroke.

The use of the mechanism is not limited to the machine shown and described, but may be extended to operate valves of any kind.

I claim:

1. In a valve operating mechanism, the combination of a valve, a pump, and a fluid pressure device having a reciprocating member connected to the valve, said device having an inlet from the pump to admit pressure to said member and a return outlet to the pump opened and closed by the movement of said member.

2. In a valve operating mechanism, the combination of a valve, a pump, a cylinder having an inlet from the pump and an outlet to the pump, and a piston in the cylinder, connected to the valve, and movable across said outlet to open and close the same.

3. The combination with a steam engine cylinder, of an exhaust valve therefor, a pump for operating said valve, and means governed by variations of pressure in the exhaust pipe to control the operation of the pump.

4. The combination with a steam engine cylinder, of a normally-closed exhaust valve therefor, a fluid pressure device separate from the cylinder and operatively communicating with the valve to open the same, and means governed by reduction of pressure in the exhaust pipe for preventing the effective operation of said device on the valve.

5. In a valve operating mechanism for steam engines, the combination with an exhaust valve, of a pump for operating said valve when the engine is running non-condensing, and means governed by vacuum in the exhaust pipe for suspending the effective operation of said pump when the engine is running condensing.

6. The combination with a steam engine cylinder having main and auxiliary exhaust ports, and a valve controlling the auxiliary port, of a pump for operating said valve when the engine is running non-condensing, and means governed by vacuum in the exhaust pipe for preventing action of the pump on the valve when the engine is running condensing.

7. In a valve operating mechanism for steam engines, the combination with an exhaust valve, of a pump for operating said valve, and a valve governed by variations of pressure in the exhaust pipe controlling the effective action of said pump on the exhaust valve.

8. In a valve operating mechanism for steam engines, the combination with an exhaust valve, of a pump for operating said valve, a by-pass in the pump, and a controlling valve in the by-pass actuated by vacuum in the exhaust pipe and adapted to open said by-pass and prevent effective action of the pump on the exhaust valve when the engine is running condensing.

9. In a valve operating mechanism for steam engines, the combination with an exhaust valve, of a pump operatively communicating with said valve, a by-pass in the pump, a controlling valve and its casing in the by-pass, and a connection between said casing and the exhaust pipe of the engine, exposing said controlling valve to vacuum in the exhaust pipe, to open the same and stop the action of the pump on the exhaust valve when vacuum exists.

In testimony whereof, I affix my signature in presence of two witnesses.

JOHN C. GLENN.

Witnesses:
 BARRETT S. BRAINERD,
 HARRY G. ADAM.